(12) United States Patent
Itoh et al.

(10) Patent No.: US 7,941,038 B2
(45) Date of Patent: May 10, 2011

(54) GLASS MANUFACTURING APPARATUS, A STRUCTURAL MEMBER THEREOF AND METHOD FOR HEATING THE STRUCTURAL MEMBER BY CONDUCTION HEATING

(75) Inventors: Hajime Itoh, Yokohama (JP); Sei Nagano, Yokohama (JP); Yasuharu Hirabara, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 641 days.

(21) Appl. No.: 11/947,825

(22) Filed: Nov. 30, 2007

(65) Prior Publication Data
US 2008/0092597 A1    Apr. 24, 2008

Related U.S. Application Data

(63) Continuation of application No. PCT/JP2006/309029, filed on Apr. 28, 2006.

(30) Foreign Application Priority Data

Jun. 6, 2005  (JP) ................................. 2005-165735

(51) Int. Cl.
H05B 3/03 (2006.01)
H05B 3/60 (2006.01)
C03B 5/225 (2006.01)
C03B 7/06 (2006.01)
C03B 7/07 (2006.01)

(52) U.S. Cl. ............ 392/338; 65/355; 373/36; 392/314; 392/323; 392/465; 392/480; 392/482

(58) Field of Classification Search ................ 65/355; 392/314, 323, 338, 465, 478, 479, 480, 482
See application file for complete search history.

(56) References Cited

U.S. PATENT DOCUMENTS

| | | | |
|---|---|---|---|
| 4,590,950 A * | 5/1986 | Iwaszkiewicz et al. | 607/119 |
| 4,967,755 A * | 11/1990 | Pohndorf | 600/488 |
| 5,851,258 A | 12/1998 | Ando et al. | |
| 6,286,337 B1 * | 9/2001 | Palmquist | 65/157 |
| 6,405,067 B1 * | 6/2002 | Mest et al. | 600/374 |
| 2008/0050609 A1 * | 2/2008 | Abe et al. | 428/592 |

FOREIGN PATENT DOCUMENTS

| | | |
|---|---|---|
| JP | 06-227822 A | 8/1994 |
| JP | 10-152329 A | 6/1998 |
| JP | 11-349334 A | 12/1999 |

* cited by examiner

*Primary Examiner* — Matthew J Daniels
*Assistant Examiner* — Cynthia Szewczyk
(74) *Attorney, Agent, or Firm* — Oblon, Spivak, McClelland, Maier & Neustadt, L.L.P.

(57) ABSTRACT

A hollow tubular body for molten glass in which local-overheating is reduced at the time of conduction heating. The hollow tubular body has a platinum or platinum alloy hollow tube, used for conduction heating, wherein a platinum or platinum alloy ring electrode is joined to the outer circumference of the hollow tube, a lead-out electrode is joined to an outer edge of the ring electrode, and a thick portion is provided in at least the joint portion closest to the lead-out electrode, of the ring electrode and in the vicinity thereof.

10 Claims, 3 Drawing Sheets

GLASS MANUFACTURING APPARATUS, A STRUCTURAL MEMBER THEREOF AND METHOD FOR HEATING THE STRUCTURAL MEMBER BY CONDUCTION HEATING

BACKGROUND OF THE INVENTION

1. Field of the Invention

The present invention relates to a hollow tubular body having a platinum or platinum alloy hollow tube, suitable for a conduit for molten glass of a glass manufacturing apparatus.

The present invention relates to a glass manufacturing apparatus employing such hollow tubular body.

The present invention relates to a method for heating the hollow tubular body by conduction heating.

2. Discussion of Background

In a glass manufacturing apparatus, a hollow tube made of platinum or a platinum alloy such as a platinum-gold alloy or a platinum-rhodium alloy is employed as a conduit in which molten glass of high-temperature is passed.

In a molten glass feeding apparatus described in JP-A-6-227822 for example, a platinum or platinum alloy pipe is connected to a molten glass outlet located in a lower portion of the glass melting tank. As other examples of the conduit for feeding molten glass, there are a discharge pipe provided to remove impurities from a glass manufacturing apparatus, a discharge pipe for feeding molten glass from a glass manufacturing apparatus to a molding die in order to form an optical element such as lens, prism or the like.

In the glass manufacturing apparatus, the conduit in which molten glass is passed is heated in order to adjust the temperature of the molten glass. There is a case that the conduit is heated from the outside by means of a heat source such as a heater or the like. However, in the case of a platinum or platinum alloy hollow tube, it has been popularly practiced to provide an electrode on the hollow tube to carry out conduction heating.

JP-A-11-349334 discloses a heating device made of platinum usable for a conduit for molten glass. FIG. 5 is a perspective view of the heating device disclosed in JP-A-11-349334. In FIG. 5, reference numeral 100 designates a heating tube of platinum as a heating member, numerals 200a and 200b designate ring electrodes of platinum, and numerals 300a and 300b designate lead-out portions for the electrodes. When the heating device shown in FIG. 5 is used, the electrode lead-out portions 300a, 300b joined to ends of the ring electrodes 200a, 200b are connected to an external power source (not shown), and the heating tube 100 is heated by feeding a current from the external power source.

SUMMARY OF THE INVENTION

The inventors of this patent application have found that when the heating device shown in FIG. 5 is heated by conduction heating, the current is concentrated to a specified portion of the heating pipe 100 whereby this portion is subjected to local-overheating. When such local-overheating occurs, there is a danger that the heating pipe 100 is broken due to a thermal stress or there causes alteration of the molten glass passing through the heating pipe 100.

The present invention has been achieved on the basis of such finding and it is an object of the present invention to provide a hollow tubular body having a platinum or platinum alloy hollow tube by which local-overheating is reduced at the time of conduction heating. The hollow tubular body of the present invention is suitably used for a conduit for molten glass in a glass manufacturing apparatus.

It is an object of the present invention to provide a molten glass manufacturing apparatus employing such hollow tubular body as a conduit for molten glass.

Further, it is an object of the present invention to provide a method for heating such hollow tubular body by conduction heating.

In order to achieve the above-mentioned objects, there is provided a hollow tubular body having a platinum or platinum alloy hollow tube, used for conduction heating, the hollow tubular body being characterized in that a platinum or platinum alloy ring electrode is joined to the outer circumference of the hollow tube, a lead-out electrode is joined to an outer edge of the ring electrode, and the hollow tube is provided with a thick portion in at least the joint portion closest to the lead-out electrode, of the ring electrode and in the vicinity thereof.

Further, there is provided a hollow tubular body having a platinum or platinum alloy hollow tube, used for conduction heating, the hollow tubular body being characterized in that a platinum or platinum alloy ring electrode is joined to the outer circumference of the hollow tube, a lead-out electrode is joined to an outer edge of the ring electrode, and the hollow tube is provided with a thick portion over its whole circumference in the joint portion to the ring electrode.

In each of the hollow tubular body of the present invention, it is preferred that the thick portion satisfies the following formulas (1) and (2):

$$0.4d \leq L \leq 1.2d \quad (1)$$

$$1.2t_0 \leq t \leq 1.7t_0 \quad (2)$$

where L represents the length (mm) of the thick portion in the area excluding the joint portion to the ring electrode, d represents the outer diameter (mm) of the hollow tube, t represents the wall thickness (mm) of the thick portion and $t_0$ represents the wall thickness (mm) of the hollow tube in the area excluding the thick portion.

In a case that the thick portion is provided in only a part in a circumferential direction of the hollow tube, the thick portion is preferably formed with an angle of 20° or more with respect to a linear line, as the center line, extending from the center of the ring electrode to the midpoint of the joint portion of the lead-out electrode.

Further, the present invention is to provide a glass manufacturing apparatus employing any of the hollow tubular bodies as mentioned above, as a conduit for molten glass.

Further, the present invention is to provide a sub-atmospheric apparatus employing any of the hollow tubular bodies as mentioned above, as a conduit for molten glass.

Further, the present invention is to provide a method for heating any of the hollow tubular bodies as mentioned above by conduction heating.

DETAILED DESCRIPTION OF THE PREFERRED EMBODIMENTS

Figure 1:
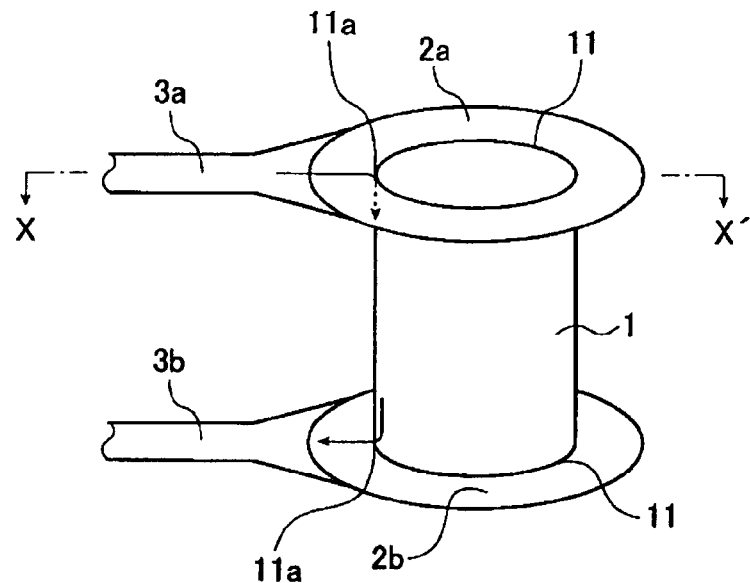
FIG. 1 is a perspective view showing an embodiment of the hollow tubular body having a platinum or platinum alloy hollow tube according to the present invention.

The present invention will be described with reference to the drawing.

FIG. 1 is a perspective view showing an embodiment of the hollow tubular body 1 having a platinum or platinum alloy hollow tube according to the present invention.

In FIG. 1, the hollow tube 1 is a circular cylindrical tube. Platinum or platinum alloy electrodes 2a, 2b are joined to the outer circumference of the hollow tube 1. The electrodes 2a, 2b are ring electrodes each having a circular outline and having an opening into which the hollow tube 1 is inserted. In FIG. 1, the electrodes 2a is joined to an upper end of the hollow tube 1 and the electrode 2b is joined to a lower end of the hollow tube 1.

Lead-out electrodes 3a, 3b are joined to portions of the outer edges of the electrodes 2a, 2b so that they can be connected to an external power source (not shown). Each of the lead-out electrodes 3a, 3b has a sectorial shape having a widened region in the vicinity of the joint portion to each electrode 2a or 2b.

Figure 2:
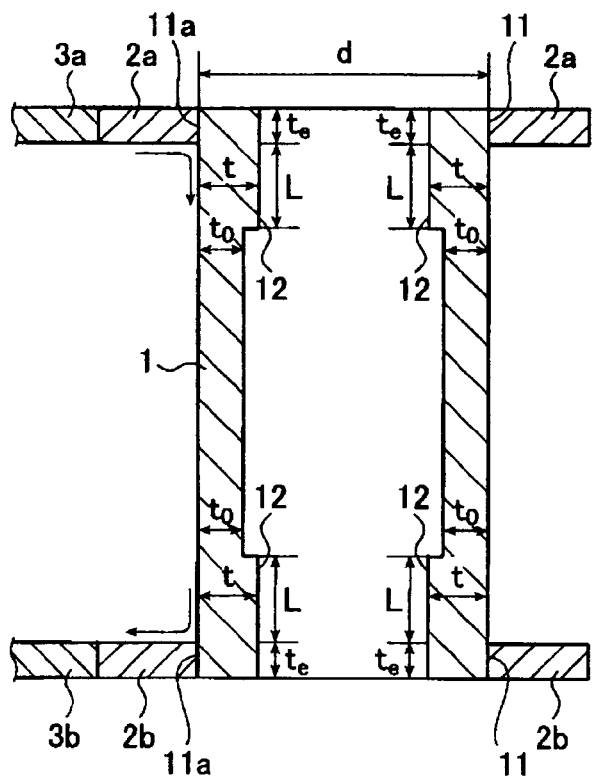
FIG. 2 is a cross-sectional view sectioned along a line X-X' of the hollow tubular body shown in FIG. 1.

FIG. 2 is a cross-sectional view taken along a line X-X' of the hollow tube 1 shown in FIG. 1. As shown in FIG. 2, the hollow tube 1 has portions of thickened wall 12 over the whole circumference of the hollow tube 1 in joint portions to the electrodes 2a, 2b and in the vicinity thereof.

In FIG. 1, when the lead-out electrodes 3a, 3b are connected to the external power source to carry out conduction heating, a current flows from the lead-out electrode 3a through the ring electrode 2a to the hollow tube 1. The ring electrode 2a is joined to the whole circumference of the hollow tube 1 so that a current flows uniformly in the whole portion of the hollow tube 1. However, since the lead-out electrode 3a is joined to a portion of the outer edge of the electrode 2a, the current flowing from the electrode 2a to the hollow tube 1 converges at a specified portion of the hollow tube 1.

The current flows through the shortest path according to its characteristic of conduction. Accordingly, when the hollow tube 1 shown in FIGS. 1 and 2 is employed, the current converges at the joint portion 11a closest to the lead-out electrode 3a, in the joint portion 11 to the electrode 2a. In FIGS. 1 and 2, the shortest path for the current is indicated by an arrow mark. Although the convergence of the current is gradually released during the propagation of current in the hollow tube 1, the current converges at a specified portion in the joint portion 11 to the electrode 2a and in the vicinity thereof, specifically, at the joint portion 11a closest to the lead-out electrode 3a and in the vicinity thereof. At a downstream area of the current path in which the current flows from the hollow tube 1 to the electrode 2b, the lead-out electrode 3b is joined to a portion of the outer edge of the electrode 2b. Accordingly, the current converges at a joint portion 11a closest from the lead-out electrode 3b. Each of these portions is subjected to local-overheating due to convergence of the current.

In the hollow tube 1 shown in FIG. 2, the wall thickness of each of the thick portions 12 provided in the joint portions 11 to the electrodes 2a, 2b is larger than that of the other portion of the hollow tube 1. Therefore, the density of the current flowing through the thick portions is lower. Accordingly, even in a case that the current converges at a specified portion in the joint portion 11 to the electrode 2a or 2b and in the vicinity thereof, the local-overheating due to the convergence of current can be reduced. The thick portion may have such a form that the wall thickness is gradually increased from $t_0$ to $t$.

The length and the wall thickness of the thick portion 12 can be selected appropriately depending on the length, the diameter, the wall thickness or the material of the hollow tube, the diameter, the wall thickness or the material of the electrode, the intensity of the current to be fed, etc. However, it is preferred that the thick portion 12 satisfies the following formulas (1) and (2):

$$0.4d \leq L \leq 1.2d \quad (1), \text{ and}$$

$$1.2t_0 \leq t \leq 1.7t_0 \quad (2)$$

In these formulas (1) and (2), L represents the length (mm) of the thick portion 12 in the area excluding is the joint portion 11 to the electrode 2a or 2b.

Accordingly, the length of the thick portion 12 is $L+t_e$ ($t_e$ represents the wall thickness (mm) of the electrode 2a or 2b). A letter d represents the outer diameter (mm) of the hollow tube 1, a letter t represents the wall thickness (mm) of the thick portion 12, and a letter to represents the wall thickness (mm) of the hollow tube 1 in the area excluding the thick portion 12.

More preferably, the thick portion satisfies $0.6d \leq L \leq 1.0d$ and $1.2t_0 \leq t \leq 1.5t_0$.

In the above-mentioned formulas, it should be noted that L, i.e. the length of the thick portion 12 in the area excluding $t_e$, can be regulated by the outer diameter of the hollow tube 1. The inventors of this application have made intensive studies on current densities etc. in the hollow tubular body having such specified structure of the present invention in order to reduce local-overheating. As a result, they have found that it is necessary to provide a thick portion in a specified portion of the hollow tube and the length of the thick portion is influenced by the outer diameter of the hollow tube 1.

When the length and the wall thickness of the thick portion 12 satisfy these formulas, the local-overheating at the time of conduction heating can sufficiently be reduced. Platinum or a platinum alloy usable as constituent materials for the hollow tube is expensive. Accordingly, the wall thickness of the hollow tube 1 should be thin as possible from the viewpoint of cost.

Figure 3:
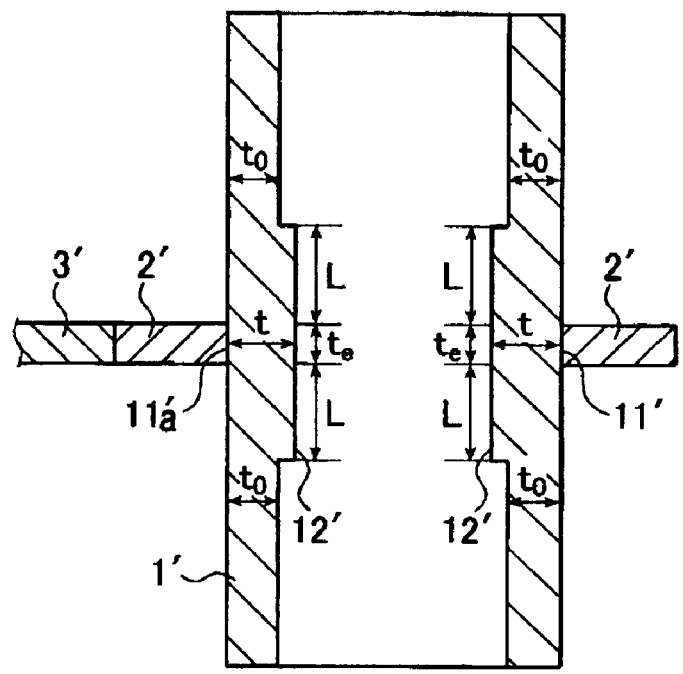
FIG. 3 is a cross-sectional view similar to FIG. 2 wherein the location where an electrode is joined and the number of electrode to be joined are different from those in FIG. 2.

FIG. 3 is a view similar to that of FIG. 2, provided that the hollow tube 1' in FIG. 3 has an electrode 2' joined to its central portion in a longitudinal direction. In the hollow tube 1' shown in FIG. 3, a thick portion 12' is provided over a length L in each of the upper and lower directions with respect to the joint portion 11' to the electrode 2'. Accordingly, the length of the thick portion 12' is $2L+t_e$ ($t_e$ represents the wall thickness (mm) of the electrode 2').

As shown in FIGS. 1 to 3, the hollow tube 1 or 1' of the present invention is only necessary to have a thick portion 12 or 12' in the joint portion 11 or 11' to the electrode 2a, 2b or 2', and in the vicinity thereof. In this case, the location of the electrode 2a, 2b or 2' to be joined and the number of the electrodes 2a, 2b or 2' to be joined are not in particular limited.

FIG. 1 shows a circular cylindrical tube as the hollow tube 1. However, the shape of the hollow tube is not limited to this. For example, it may have an elliptical, quadrangle, hexagonal, octagonal or another polygonal shape in cross section.

The number of the lead-out electrode may be one or more.

Further, FIG. 1 shows the electrode 2a or 2b having a circular outline. However, the shape of the electrode is not limited to this. For example, it may have an elliptical, quadrangle, hexagonal, octagonal or another polygonal shape in outline. The ring electrode means an electrode in a form of doughnuts, having an opening in its central portion.

The hollow tubular body of the present invention, described with reference to the drawing, is in a form that the thick portion 12 is formed over the whole circumference of the hollow tube 1. However, the hollow tubular body of the present invention may be such that the thick portion is provided in only a part in a circumferential direction of the hollow tube 1. It is preferred, however, from the viewpoint of processing that the thick portion is provided over the whole circumference.

Further, description has been made as to the embodiment that the thick portion 12 is formed at an inner side of the hollow tube 1. However, the thick portion 12 may be provided at an outer side of the hollow tube 1.

As described before, when a current is fed to the hollow tube shown in FIG. 1, the current converges at the joint portion 11a closest to the lead-out electrode 3a or 3b. Accordingly, the thick portion should be formed in at least the joint portion 11a and in the vicinity thereof in the joint portion 11 so that the effect of the present invention can be achieved.

Figure 4:
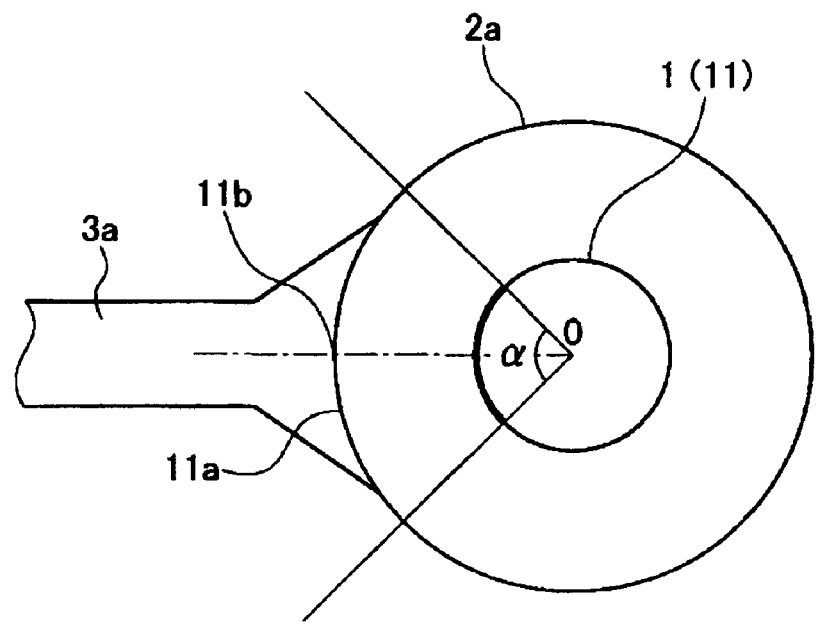
FIG. 4 is an upper plane view of the hollow tubular body shown in FIG. 1.
Figure 5:
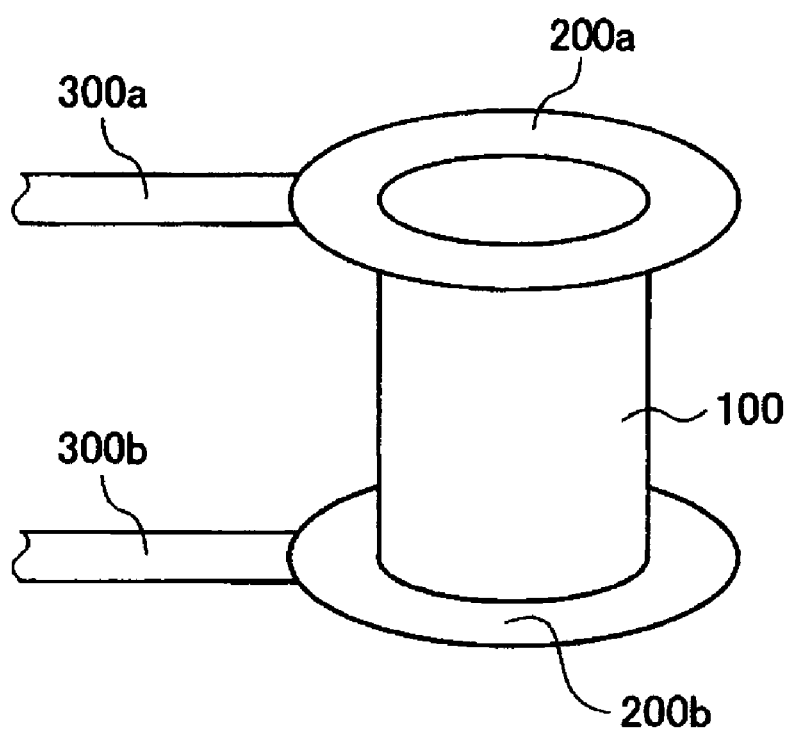
FIG. 5 is a perspective view of the heating device disclosed in JP-A-11-349334.

In the case that the thick portion is provided in only a part of the hollow tube in its circumferential direction, it is preferred that the location of the thick portion is in at least the joint portion closest to the lead-out electrode and in the vicinity thereof. Specifically, it is preferred to provide it at the location described below. FIG. 4 is an upper plane view of the hollow tube 1 shown in FIG. 1. In FIG. 4, the location of the joint portion 11a closest to the lead-out electrode, namely, the location of the thick portion to be formed in the hollow tube 1 is preferably in a range of angle α with respect to a linear line, as the center line, extending from the center O of the ring electrode 2a to the midpoint 11b of the joint portion to the lead-out electrode 3a. The angle α is at least 20°, preferably at least 50°, more preferably at least 90° and further preferably at least 180°.

The length and the wall thickness of the thick portion are the same as the case that the thick portion is formed over the whole circumference of the hollow tube. When a plurality of lead-out electrodes are to be provided, it is preferred to determine the angle α in the above-mentioned range at each location where the lead-out electrode is provided.

In the present invention, dimensions of the hollow tube and the electrode are not in particular limited. For example, in the hollow tube 1 shown in FIGS. 1 and 2, and the hollow tube 1' shown in FIG. 3, it is preferred that dimensions of the hollow tubes 1, 1' and the electrodes 2a, 2b and 2' are in the following ranges.

Hollow Tubes 1, 1'

Outer diameter d: 50 to 800 mm, more preferably, 100 to 600 mm

Length: 200 to 6,000 mm, more preferably, 400 to 2,000 mm

Wall thickness $t_0$ of the portion other than the thick portion 12: 0.4 to 5 mm, more preferably, 0.6 to 3 mm Length ($L+t_e$) of the thick portion 12 or 12': 30 to 800 mm, more preferably, 50 to 300 mm Wall thickness t of the thick portion 12 or 12': 0.5 to 8 mm, more preferably, 0.7 to 5 mm Electrodes 2a, 2b, 2'

Outer diameter: 80 to 1,200 mm, more preferably, 100 to 900 mm

Inner diameter: 50 to 800 mm, more preferably, 100 to 600 mm

Wall thickness $t_e$: 0.5 to 8 mm, more preferably, 1 to 5 mm

In the present invention, platinum is used as the major constituent material for the hollow tube 1 or 1' and the electrode 2a, 2b or 2'. Accordingly, the constituent material is not limited to platinum but it may be of a platinum alloy. The platinum alloy may be, for example, a platinum-gold alloy or a platinum-rhodium alloy. Further, it may be a strengthened platinum in which a metal oxide is dispersed in platinum or a platinum alloy. The metal oxide dispersed may be a metal oxide in Group 3, Group 4 or Group 13 in the Periodic Chart, represented by $Al_2O_3$, $ZrO_2$ or $Y_2O_3$.

In the present invention, it is not always necessary that the ring electrode 2a, 2b or 2' is of platinum or a platinum alloy in its entirety. For example, a part of a metallic material other than platinum or a platinum alloy may be provided at the outer edge of the platinum or platinum alloy electrode. Such metallic material may be molybdenum, tungsten, nickel, palladium, copper or an alloy thereof.

For the lead-out electrode 3a, 3b, 3' too, it is preferred to employ platinum as the major constituent material. However, the present invention is not limited thereto and a metallic material other than platinum or a platinum alloy as described above, may be employed.

In FIG. 1, each of the lead-out electrodes 3a, 3b has a sectorial shape having a widened region in the vicinity of the joint portion to each electrode 2a or 2b. In the present invention, the provision of the lead-out electrodes 3a, 3b with a sectorial shape in association with the thick portion can preferably reduce local-overheating in the joint portions of the electrodes 2a, 2b to the lead-out electrodes 3a, 3b.

When a current is fed to a metallic material such as platinum or a platinum alloy, the current converges at a portion having a substantial change in cross-sectional area of the material whereby local-overheating takes place.

The joint portions of the electrodes 2a, 2b to the lead-out electrodes 3a, 3b, especially, abutting ends of the electrodes 2a, 2b to the lead-out electrodes 3a, 3b have a substantial change in cross-sectional area. When each shape of the lead-out electrodes 3a, 3b is sectorial, the change of this area in cross-section is gentle at the abutting ends of joint portions whereby the occurrence of local-overheating at these portions can be reduced.

From the reason mentioned above, it is preferred that the joint portions of the electrodes 2a, 2b to the lead-out electrodes 3a, 3b preferably have such a structure that there is no substantial change in cross-sectional area. Accordingly, the difference between the wall thickness of the electrode 2a or 2b and the wall thickness of the lead-out electrode 3a or 3b in the joint portion is preferably small as possible, more preferably, they are substantially the same. Therefore, the wall thickness of each of the lead-out electrodes 3a, 3b is preferably from 0.5 to 8 mm, more preferably, from 0.7 to 5 mm.

In the present invention, a known method may be employed to join the hollow tube 1 or 1' to the electrode 2a, 2b or 2' and to join the electrode 2a, 2b or 2' to the lead-out electrode 3a, 3b or 3'. Specifically, the hollow tube 1 or 1' may be joined to the electrode 2a, 2b or 2' by welding. In this case, the electrode 2a, 2b or 2' may be welded directly to the outer circumference of the hollow tube 1 or 1'. Or, another member, e.g., a platinum or platinum alloy ring member may be disposed therebetween and the electrode 2a, 2b or 2' be welded to the interposing member. On the other hand, the electrode 2a, 2b or 2' may be welded to the lead-out electrode 3a, 3b or 3' or they may be connected with a fixing member such as bolt, screw or the like.

In the glass manufacturing apparatus of the present invention, the hollow tubular body of the present invention is employed as a conduit for molten glass in which molten glass of high-temperature is passed. Further, in the glass manufacturing apparatus of the present invention, the hollow tubular body of the present invention can be employed as, for example, a discharge pipe for removing impurities from the glass manufacturing apparatus, a discharge pipe for discharging molten glass from the glass manufacturing apparatus into a molding die in a case that an optical element such as lens, prism or the like is molded.

EXAMPLE

In the following, the present invention will be explained in more detail with reference to Examples.

Example 1

In this Example, a hollow tubular body as shown in FIGS. 1 and 2 was prepared. The structural members were joined by welding. A thick portion was formed over the whole circumference of the hollow tubular body 1. Dimensions and constituent materials of each of the structural members are as follows.

Hollow Tube 1:
  Outer diameter d: 300 mm,
  length: 1,500 mm,
  wall thickness $t_0$: 1.5 mm,
  length (L+$t_e$) of the thick portion 12: 200 mm,
  wall thickness t of the thick portion 12: 2 mm and
  constituent material: platinum-rhodium alloy (90% by mass of platinum and 10% by mass of rhodium)
Electrodes 2a, 2b:
  Outer diameter: 600 mm,
  inner diameter: 300 mm,
  wall thickness $t_e$: 3 mm and
  constituent material: platinum-rhodium alloy (90% by mass of platinum and 10% by mass of rhodium)
Lead-Out Electrodes 3a, 3b:
  Wall thickness: 4 mm and
  constituent material: platinum-rhodium alloy (90% by mass of platinum and 10% by mass of rhodium)

The lead-out electrodes 3a, 3b were connected to an external power source (a.c.) and conduction heating was conducted under the following conditions:
  Voltage: 10 V,
  current: 6,000 A and
  heating period: 10 H The temperature of the hollow tube 1 during the conduction heating was observed with a thermocouple. As a result, notable local-overheating was not recognized.

Comparative Example 1

A hollow tubular body as shown in FIG. 1 was prepared in the same manner as Example 1, provided that the hollow tube did not have a thick portion and the wall thickness was evenly 1.5 mm over the whole length of the hollow tube. Conduction heating was carried out in the same manner as Example 1. Notable local-overheating was recognized in the vicinity of the joint portions 11a closest to the lead-out electrodes 3a, 3b. After the completion of the conduction heating, cracks were recognized in the portions in which the local-heating was recognized.

Any of the hollow tubular bodies having a platinum or platinum alloy hollow tube according to the present invention can reduce local-overheating at the time of conduction heating. Accordingly, it is possible to prevent the damage of the hollow tube due to a thermal stress.

Since the glass manufacturing apparatus of the present invention employs the hollow tubular body of the present invention as a conduit for molten glass, local-overheating does not take place in the conduit at the time of conduction heating. Accordingly, there is no danger of alternation of molten glass passing through the conduit.

In the sub-atmospheric apparatus of the present invention, since the hollow tubular body of the present invention is employed for the sub-atmospheric vessel and the conduits for molten glass such as an uprising pipe, a downfalling pipe and so on, local-overheating does not take place in these conduits at the time of conduction heating. As a result, it is possible to prevent production of bubbles due to overheating under a reduced pressure. The occurrence of cracks in a sub-atmospheric vessel, an uprising pipe and a downfalling pipe under a reduced pressure is in particular problematic. However, in the sub-atmospheric apparatus of the present invention, the possibility of occurrence of cracks can be reduced because the local-overheating does not take place in these conduits for molten glass at the time of conduction heating.

The entire disclosure of Japanese Patent Application No. 2005-165735 filed on Jun. 6, 2005 including specification, claims, drawings and summary is incorporated herein by reference in its entirety.

What is claimed is:

1. A hollow tubular body used for conduction heating, comprising:
  a hollow tube made of one of platinum and a platinum alloy;
  a ring electrode joined to an outer circumference portion of the hollow tube, the ring electrode being made of one of platinum and a platinum alloy; and
  a lead-out electrode joined to an outer edge portion of the ring electrode, wherein the hollow tube is provided with a thick portion in at least a joint portion of the ring electrode and in the vicinity thereof, the thick portion being made of a same material as the hollow tube.

2. A hollow tubular body used for conduction heating, comprising:
  a hollow tube made of one of platinum and a platinum alloy;
  a ring electrode joined to an outer circumference of the hollow tube; and
  a lead-out electrode joined to an outer edge of the ring electrode, wherein the hollow tube is provided with a thick portion over its whole circumference in a joint portion to the ring electrode, the thick portion being made of a same material as the hollow tube.

3. The hollow tubular body according to claim 1 or 2, wherein the thick portion satisfies the following formulas (1) and (2):

$$0.4d \leq L \leq 1.2d \quad (1) \text{ and}$$

$$1.2t_0 \leq t \leq 1.7t \quad (2)$$

where L represents a length (mm) of the thick portion in an area excluding the joint portion to the ring electrode, d represents an outer diameter (mm) of the hollow tube, t represents a wall thickness of the thick portion and t0 represents a wall thickness (mm) of the hollow tube in the area excluding the thick portion.

4. The hollow tubular body according to claim 1 or 2, wherein the thick portion is formed with an angle of 20° or more with respect to a linear center line, extending from a center of the ring electrode to a midpoint of the joint portion to the lead-out electrode.

5. The hollow tubular body according to claim 1 or 2, wherein the thick portion reduces local-overheating in the joint portion closest to the hollow tube, of the lead-out electrode.

6. The hollow tubular body according to claim 1 or 2, wherein a length of the thick portion in an area excluding the joint portion to the ring electrode is from 30 to 800 mm.

7. The hollow tubular body according to claim 1 or 2, wherein an outer diameter of the hollow tube is from 50 to 800 mm.

8. The hollow tubular body according to claim 1 or 2, wherein a wall thickness of the thick portion is from 0.5 to 8 mm.

9. The hollow tubular body according to claim 1 or 2, wherein a wall thickness of the hollow tube in an area excluding the thick portion is from 0.4 to 5 mm.

10. The hollow tubular body according to claim 1 or 2, wherein a wall thickness of the ring electrode is substantially the same as that of the lead-out electrode.

* * * * *